United States Patent [19]
Gerstein et al.

[11] Patent Number: 5,559,759
[45] Date of Patent: Sep. 24, 1996

[54] METHOD OF ALERTING MARINE MAMMALS AND OTHER MAMMALS UNDERWATER OF THE DANGER OF APPROACHING MOTOR VESSELS

[76] Inventors: Laura A. Gerstein; Edmund R. Gerstein, both of 1318 SW. 14th St., Boca Raton, Fla. 33486; Joseph E. Blue, 3313 Northglen Dr., Orlando, Fla. 32806

[21] Appl. No.: 352,874

[22] Filed: Dec. 9, 1994

[51] Int. Cl.$^6$ ..................................................... H04B 1/02
[52] U.S. Cl. ........................... 367/139; 367/137; 367/909
[58] Field of Search .................................. 367/137, 139, 367/131, 909; 116/22 A; 43/17.1

[56] References Cited

U.S. PATENT DOCUMENTS

| | | | |
|---|---|---|---|
| 4,922,468 | 5/1990 | Menezes | 367/139 |
| 5,142,505 | 8/1992 | Peynaud | 367/909 |
| 5,303,204 | 4/1994 | Wertsberger | 367/909 |

FOREIGN PATENT DOCUMENTS 3057791  3/1991  Japan.

OTHER PUBLICATIONS

Twiss, J. R., "Manatee: Endangered Marine Mammal" Water Spectrum, Winter 79–80, V12, N1, P10 (8).

*Primary Examiner*—Ian J. Lobo
*Attorney, Agent, or Firm*—Robert M. Downey, P.A.

[57] ABSTRACT

A method of alerting marine mammals and other mammals underwater to the danger of approaching motor vessels includes generating a pulsed acoustical signal at a predetermined source frequency and at a fixed or variable (with boat speed) sound pressure level and projecting the generated signal underwater in a highly directional manner from a motor vessel and in a direction corresponding with the direction of travel of the motor vessel or from fixed hazards which present a danger to mammals underwater; the projected pulsed acoustical signal having an underwater frequency ranging between 3 kHz and 26 kHz.

5 Claims, 4 Drawing Sheets

| TABLE 2: CRITICAL RATIO (CR'S) FOR WEST INDIAN MANATEE UNDERWATER HEARING PERCEPTION | | | | | | | |
|---|---|---|---|---|---|---|---|
| CENTER FREQUENCY (KHz) | RMS VOLTS PER Rt Hz OF SPECTRUM NOISE 1/3 OCTAVE BANDWIDTH | MASKING NOISE re:1μPa dB | MASKING THRESHOLD re:1μPa dB | CRITICAL RATIO dB | STANDARD DEVIATION | N | DATE |
| .5 | -74.32 | 78.68 | 105.3389 | 26.65 | 2.45789 | 18 | 07/24/94 |
| .5 | -71.08 | 81.92 | 107.7232 | 25.8 | 2.8906 | 14 | 07/23/94 |
| 1.6 | -65.05 | 87.95 | 107.0455 | 19.0955 | 2.49199 | 19 | 07/22/94 |
| 1.6 | -67.97 | 85.03 | 103.9583 | 18.9283 | 2.31863 | 10 | 07/20/94 |
| 1.6 | -75.40 | 77.60 | 97.21429 | 19.61429 | 2.00 | 29 | 07/13,07/19/94 |
| 3. | -68.23 | 84.77 | 97.31282 | 12.54282 | 1.9388 | 28 | 07/07,07/09/94 |
| 3. | -79.33 | 73.67 | 86.64286 | 12.97826 | 2.53144 | 28 | 07/10,07/11/94 |
| 6. | -71.30 | 81.70 | 96.50 | 14.8 | 1.76383 | 21 | 06/29,06/30/94 |
| 6. | -76.20 | 76.80 | 91.31364 | 14.51364 | 2.0537 | 20 | 06/28,07/06/94 |
| 6. | -82.50 | 70.50 | 84.42857 | 13.92857 | 1.54919 | 15 | 07/05,07/06/94 |
| 12. | -70.38 | 82.62 | 111.3333 | 28.7133 | 2.11302 | 16 | 07/27/94 |
| 12. | -85.43 | 67.57 | 93.77778 | 26.20778 | 2.84421 | 17 | 07/24/94 |
| 18. | -77.38 | 65.62 | 99.375 | 23.755 | 2.78107 | 16 | 07/31/94 |
| 18. | -86.32 | 66.68 | 82.825 | 16.195 | 2.195715 | 14 | 07/29/94 |

Fig. 3

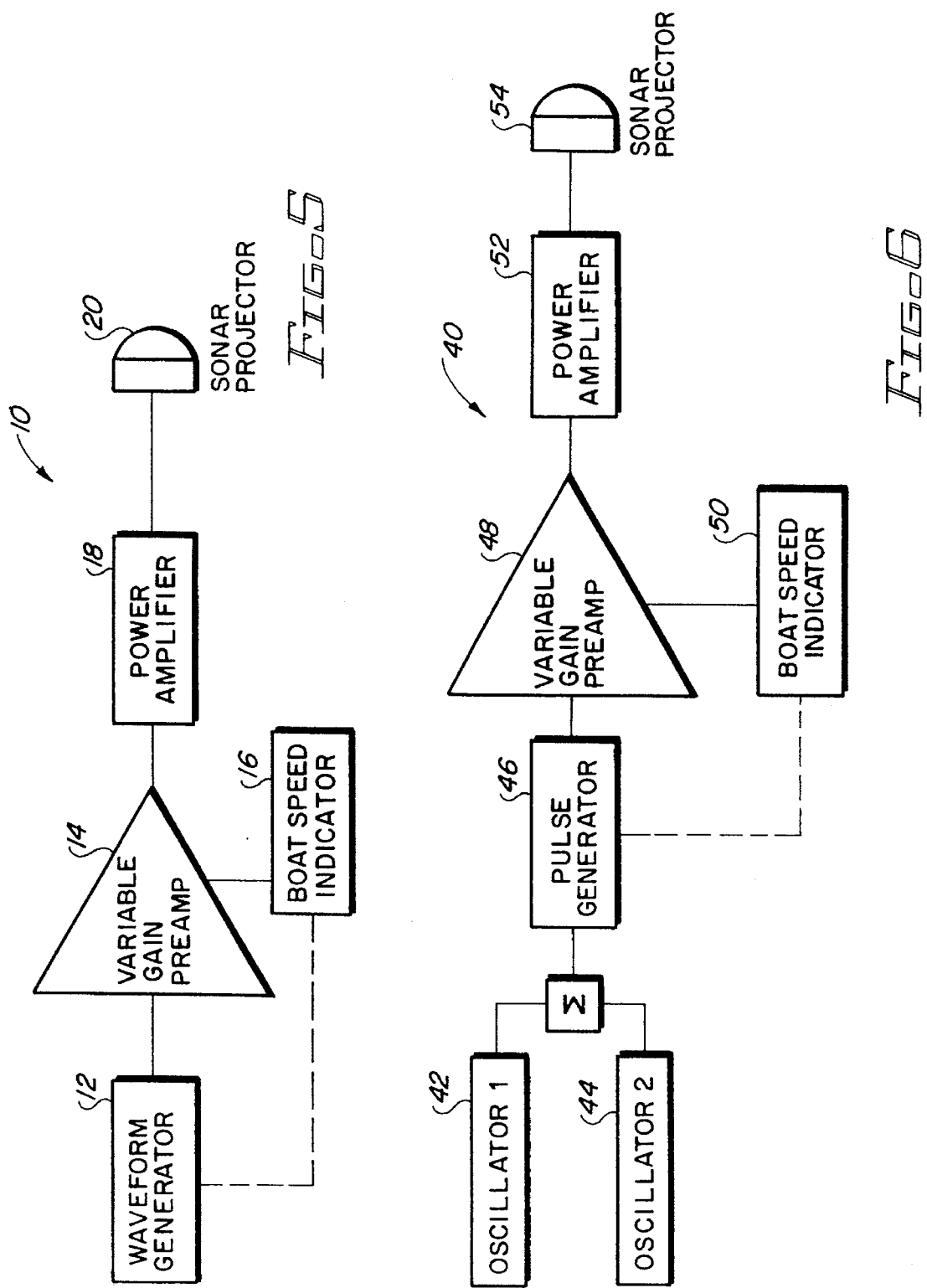

METHOD OF ALERTING MARINE MAMMALS AND OTHER MAMMALS UNDERWATER OF THE DANGER OF APPROACHING MOTOR VESSELS

BACKGROUND OF THE INVENTION

1. Field of the Invention

The present invention relates to a means of providing highly directional acoustic cues to mammals underwater and, more particularly, to a method of alerting marine mammals and other mammals underwater to the danger of approaching motor vessels by projecting highly directional pulsed acoustic signals underwater within a predetermined frequency range.

2. Description of the Related Art

The danger of being struck and run over by motor boats presents one of the greatest threats to mammals underwater. Unlike many fish and other sea life, mammals such as manatee, whales and even humans generally have limited perception and reaction abilities underwater, thereby making it difficult to detect the presence and directional movement of an approaching motor boat in sufficient time to take evasive action. It is therefore not surprising that one of the leading human related causes of death for the endangered manatee is collision with boats. The inability of manatees to avoid collisions with boats was a mystery until the inventors hereof embarked on a research program to study the sensory capabilities of the manatee. Therefore, the only prior method of avoiding manatee/boat collisions was to impose very restrictive speed limits on boats operating in manatee habitats.

It is generally known that fish react to certain acoustical signals underwater, and thus various systems and methods for controlling fish behavior have been developed in the related art. Some of these systems are designed to elicit attraction or repulsion behavioral responses in fish. Examples of these types of systems are disclosed in the Kowalewski, U.S. Pat. No. 4,646,276 and E. L. Pipkin et al, U.S. Pat. No. 3,538,493. Still other methods using sounds projected underwater are designed to modify fish behavior in a manner causing them to swim along a desired path, as disclosed in the Suomala, U.S. Pat. No. 4,932,007. While the various systems and methods in the related art have been found to be useful for their intended purpose, namely controlling fish behavior, they are not suitable for use to alert marine mammals and other mammals underwater of impending danger. Specifically, the fish behavior control systems known in the related art generally operate at frequency levels below one 1 kHz, which is too low to be audible to most mammals underwater in a near surface marine environment. Further, none of the systems known in the prior art are designed to project a highly directional pulsed acoustical signal underwater and in the direction of movement of a motor vessel, within a frequency range audible to mammals underwater and near the water surface so that mammals along the path of travel of the vessel will be alerted to the danger and thus be prompted to take early evasive action.

SUMMARY OF THE INVENTION

The present invention is directed to a method of alerting mammals underwater of the danger of approaching motor boats using a linear or parametric sonar projecting device. In accordance with the method of the present invention, the sonar projecting device generates a pulsed acoustical signal having a predetermined source frequency and either a fixed or variable sound pressure level. The generated signal is projected underwater from a motor vessel in the direction of travel of the motor vessel. In order to be audible to mammals near the water surface, the acoustical signal must have an underwater frequency ranging between 3 kHz and 26 kHz. Using linear sonar, the acoustical signals are projected directly in the frequency range of 3 kHz to 26 kHz. On the other hand, using a nonlinear or parametric sonar device, the underwater frequency range is created by the nonlinearity of the water. In this instance, the nonlinear or parametric sonar device emits two or more high frequency sounds with the difference in frequency being the resultant underwater frequency in the 3 kHz to 26 kHz range. The pulsed rate of the signal can be varied between 2 pulses per second to 25 pulses per second. Further, the pulse repetition rate can be proportional to the boat speed. By using a pulsed signal, and varying the pulse repetition rate, manatees and other mammals underwater will learn to associate the danger of fast approaching boats while further associating the lower rates of the pulsed signals with slower moving boats. In this manner, mammals can better detect and localize the boats in sufficient time to take evasive action and avoid danger.

With the foregoing in mind it is a primary object of the present invention to provide a method of alerting marine mammals and other mammals underwater to the danger of approaching motor vessels so that they can have sufficient warning to take evasive action.

It is a further object of the present invention to provide a method of alerting marine mammals and other mammals underwater by generating highly directional pulsed acoustical signals within a frequency range audible to mammals underwater, taking into consideration the background noise spectrum in a marine environment and the Lloyd Mirror Effect (surface reflection of sound near the air/water interface).

It is still a further object of the present invention to provide a method of alerting marine mammals and other mammals underwater to the dangers of approaching motor vessels by projecting highly directional acoustical signals in the direction of travel of a motor vessel within a frequency range of 3 kHz to 26 kHz.

It is yet a further object of the present invention to provide a method of alerting marine mammals and other mammals underwater to the danger of approaching motor vessels using a linear sonar projecting system adapted to project highly directional pulsed acoustical signals underwater in a direction of travel of the motor vessel within a frequency range of 3 kHz and 26 kHz.

It is still a further object of the present invention to provide a method of alerting marine mammals and other mammals underwater to the danger of approaching motor vessels by projecting two or more high frequency sounds to create difference frequencies in the frequency range of 3 kHz to 26 kHz due to the nonlinearity of water.

It is a further object of the present invention to provide a method of alerting marine mammals and other mammals underwater to the danger associated with fixed structures which pose hazards to mammals during their operation such as water control gates, locks and water intake conduits.

These and other objects and advantages of the present invention will be more readily apparent in the description which follows.

BRIEF DESCRIPTION OF THE DRAWINGS

For a fuller understanding of the nature of the present invention, reference should be had to the following detailed description taken in connection with the accompanying drawings which:

FIG. 3 is a table setting forth critical ratios for the West Indian manatee underwater hearing perception taking into account masked threshold levels and masking noise.

FIG. 5 is a schematic diagram of a linear sonar projecting system used in connection with the method of the method of the present invention.

FIG. 6 is a schematic diagram of a parametric sonar projecting system used in connection with the method of the present invention.

Like reference numerals refer to like parts in FIGS. 5 and 6.

DETAILED DESCRIPTION OF THE PREFERRED EMBODIMENTS

The present invention is directed to a method of alerting marine mammals and other mammals underwater to the danger of approaching motor vessels using linear or parametric sonar projecting devices to generate and project a highly directional acoustical signal underwater from a motor boat.

While much of the following data and examples are directed to alerting manatee, it should be recognized that the method of the present invention is suitable for alerting other mammals underwater, including humans of the danger of approaching motor vessels so that they have sufficient warning as to the direction and general speed of the approaching vessel in order to take evasive action.

Referring now specifically to the manatee, in order to derive the specific information necessary to design an effective device for alerting a manatee to the danger of an approaching boat, in accordance with the method of the present invention, it is necessary to have knowledge of the following:

1. The manatee's audiogram which is a graph of the manatee's hearing threshold as a function of frequency,
2. The directional hearing ability of he manatee as a function of frequency,
3. The ability of a manatee to hear signals in background noise,
4. The rate at which a manatee can move,
5. The frequency spectrum of motor boat noise,
6. The background noise spectrum in manatee habitats,
7. The physics of sound propagation in manatee habitats, particularly near the air/water interface (surface).

The required knowledge of items 1–3 above was not known until the inventors hereof embarked on research efforts to measure the manatee's hearing abilities. Using knowledge from these 7 areas, it became readily apparent why manatees are repeatedly run over by motor boats. Further, having knowledge of the above items, the inventors hereof set forth to develop an effective device to install on boats to alert manatees and other mammals far enough in advance of arrival of the boat so that the mammals, and particularly manatees, have time to take evasive action.

Figure 1:
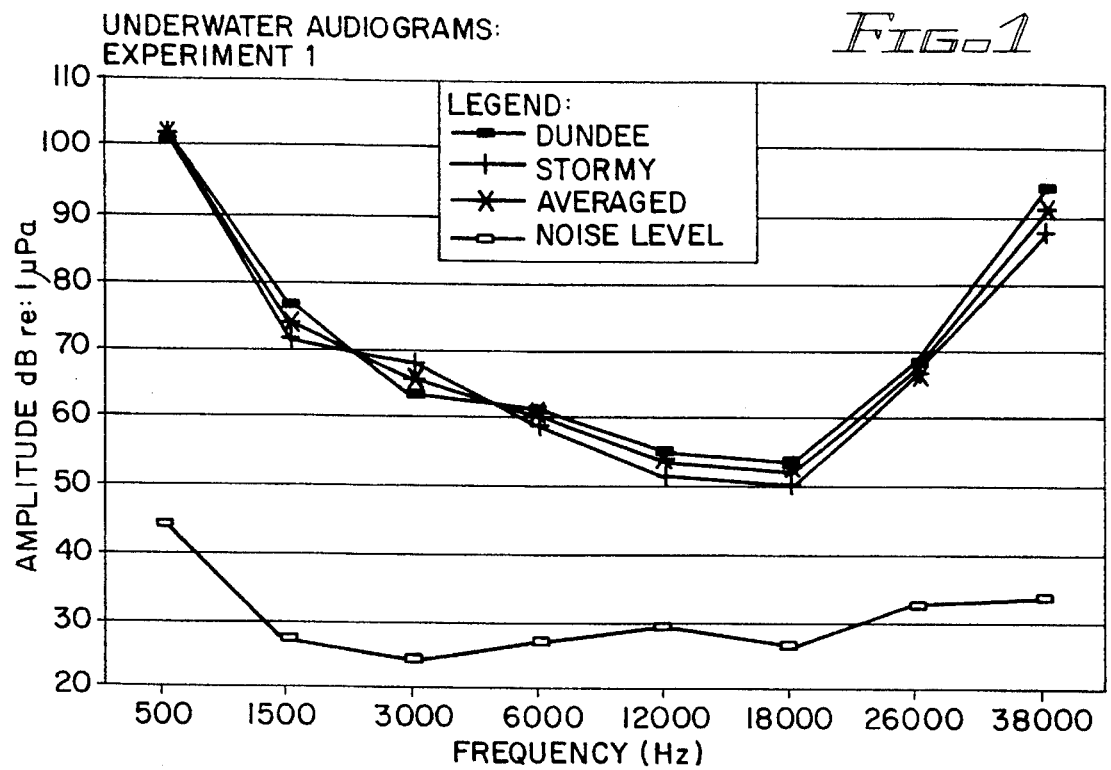
FIG. 1 is an audiogram showing the manatee's hearing threshold underwater.
Figure 2:
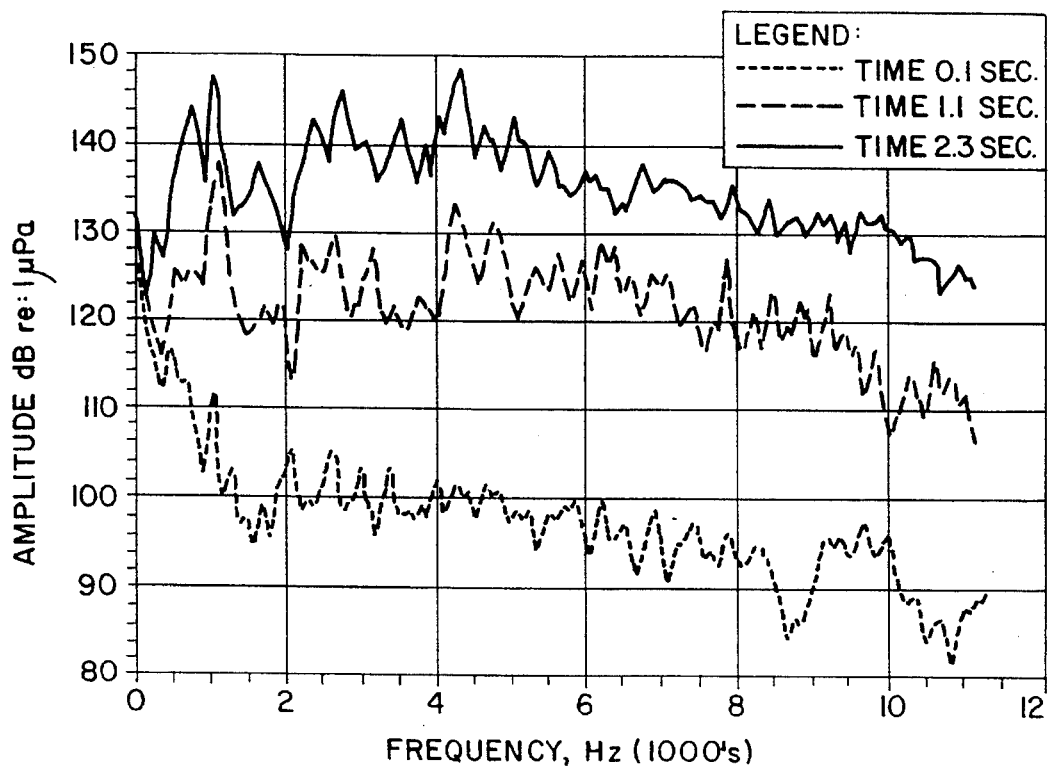
FIG. 2 is a chart illustrating a spectrum of noise from a motor boat measured underwater.

The manatee's threshold of hearing is depicted in FIG. 1 by the audiogram that the inventors measured through an extensive research effort. This shows the unexpected result that manatees do not hear low frequencies well, but hear best at around 16 kHz. Below 1 kHz the sound pressure level has to exceed 90 dB re 1µ Pa for manatees to hear a pure tone. FIG. 2 shows the power spectrum for a motor boat at a speed of about 30 MPH about 100 ft. from a hydrophone mounted at a middepth in 10 ft. of water. By overlaying FIGS. 1 and 2, we have concluded that manatees could hear a motor boat traveling at 30 MPH at 100 ft. distance at a middepth of 5 ft. However, it is well known that manatees do not get run over by boats when they are at depths of 5 ft. or more, but get hit when very close to the surface. Due to the Lloyd Mirror Effect, it is more difficult to detect sound pressure near the air/water interface since sound pressure is near zero in this area for low frequencies. The frequencies below some predetermined cut off frequency do not propagate to any large degree. In 10 ft. of water where the motor boat power spectra was obtained, the cutoff frequency is about 1 kHz.

In FIG. 2, the power seen below 1 kHz is primarily ambient noise. The boat's motor turning at 4000 RPM should have noise primarily around harmonics of 67 Hz associated with shaft and blade rates and harmonics thereof in deep water. What is seen in FIG. 2 is the broadband cavitation noise that is above the 1 kHz cutoff frequency. This noise level of 100 dB re 1µ Pa is about 20–30 dB above the manatee's hearing threshold, so that the manatee could hear this noise under quiet ambient conditions such as existed where the audiogram was made. Unfortunately, manatee habitats do not necessarily have the low ambient noise levels found at the quiet site where the audiogram was measured and manatees are struck at depths of less than 5 feet.

Figure 4A:
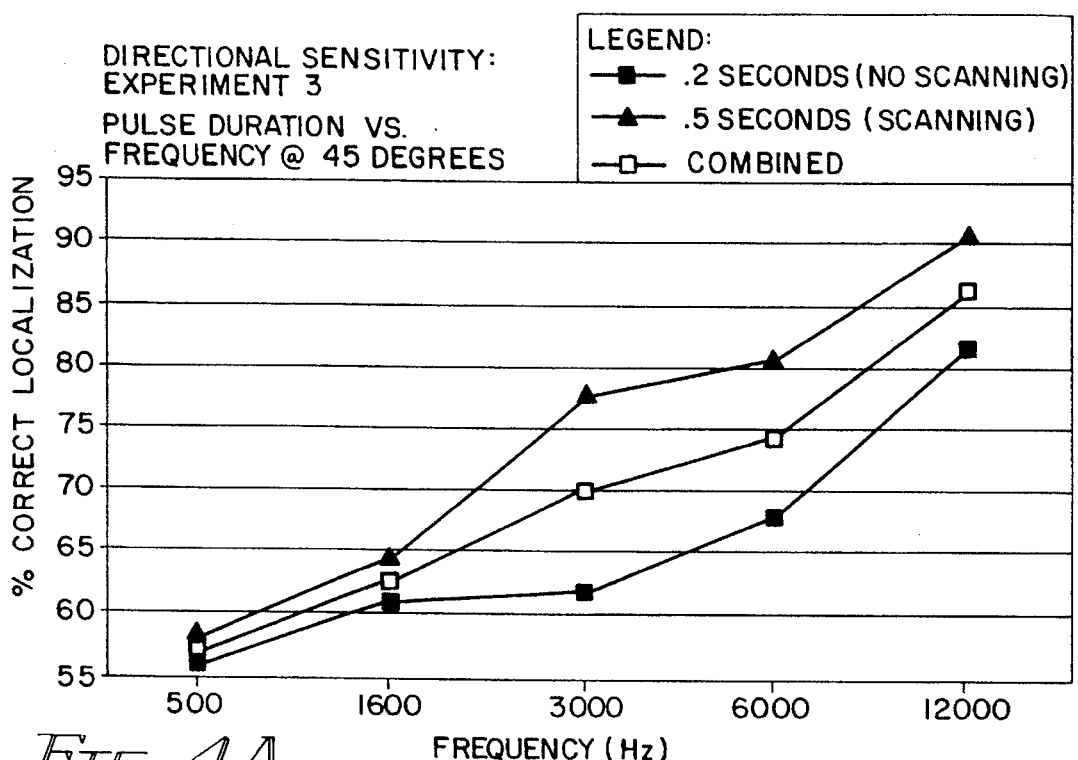
FIG. 4a and 4b are charts illustrating directional hearing ability of manatees under water measured at angles of 45 degrees and 95 degrees respectfully.
Figure 4B:
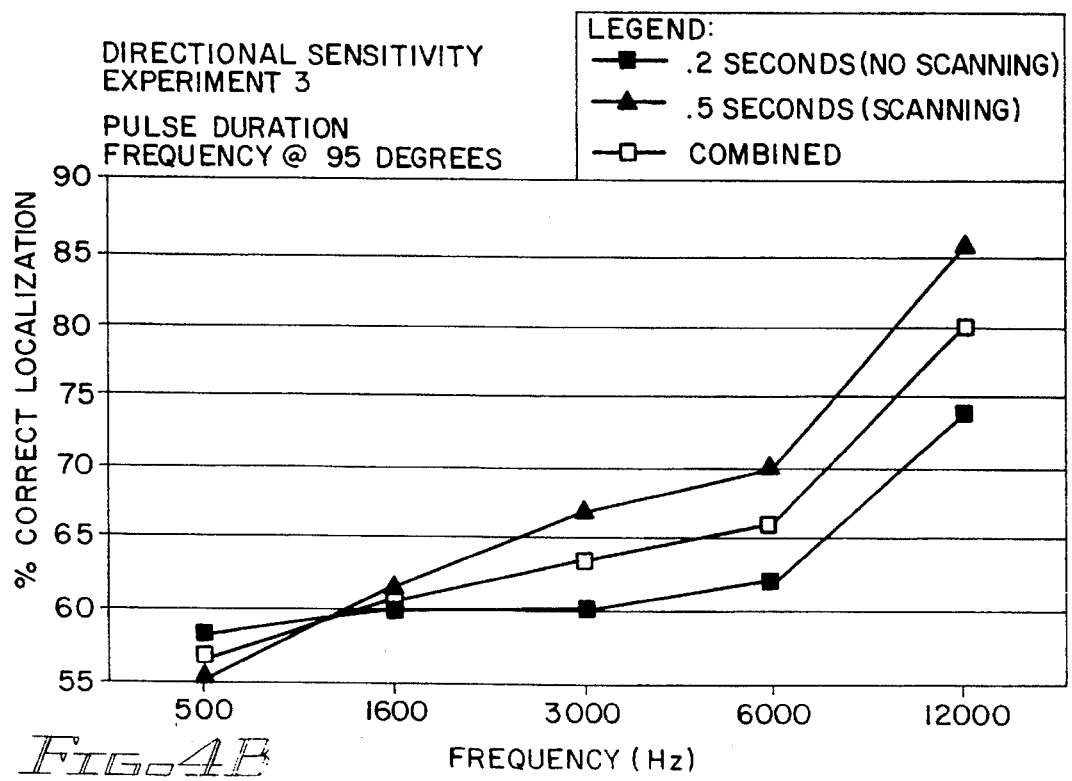

To understand how well manatees hear in a noisy background, we turn to the masking studies performed by the inventors. FIG. 3 illustrates the masked thresholds for manatees, showing the critical ratios being less in the manatee's vocalization range than one would expect. In the 15 kHz region signals must be approximately 27 dB above background noise to be heard. Thus, for manatees to hear a boat at a range of 175 ft., the sound pressure must be approximately 127 dB if the masking level is 100 dB, which is likely in areas with boat traffic. To generate the required 127 dB at a 175 ft. range, a source level of about 162 dB is required. In accordance with the present invention, it is preferable that an alarm sound be generated and projected from a boat in a highly directional and pointed manner, above the measured critical ratios set forth in FIG. 3, and in a direction corresponding with the direction of travel of the boat. The alarm signal should not be continuous waves tones, since pulsed signals have been shown through studies conducted by the inventors, to be more readily detectable (both directionally and distinguished form normal background noise) than continuous wave tones. Referring to FIGS. 4a and 4b, it is seen that manatees have very good directional discrimination capabilities above 10 kHz. Thus, manatee and other mammals underwater will go through a learning process to be able to better distinguish and associate normal noise from a potential danger. Through the course of the inventors studies and experiments, manatees have demonstrated the cognitive ability to make such learned associations.

FIG. 5 is a schematic diagram of a linear sonar transmitting system that can be used in connection with the method of the present invention. The linear sonar transmitting system, generally indicated as 10, consists of a wave form generator 12, a variable gain amplifier 14, a boat speed indicator 16, a power amplifier 18 and a sonar projector 20. The waveform generator 12 is a simple oscillator set to generate, for example, 50 msec pulses of 15 kHz center frequency at a rate of 10 times per second, or alternatively the pulse rate being controlled by the boat speed. The variable gain preamplifier is controlled by a voltage derived from a boat speed indicator device. Alternatively, the preamplified gain may be fixed. The sonar projector has a 3 dB horizontal beamwidth of 12 degrees to give a width of 35 ft. at a range of 175 ft. To give this width at 15 kHz, the projector must be about 20 inches wide. For a vertical beamwidth of 30 degrees, the height of the transducer must be about 4 inches.

Alternatively, referring to FIG. 7, there is shown a schematic diagram illustrating a parametric sonar projecting system (nonlinear) that might be preferable to that of the linear system. The parametric sonar projecting system, generally indicated as 40 includes two oscillators including a first oscillator 42 and a second oscillator 44 set at 145 kHz and 160 kHz respectively. The generated frequencies of the two oscillators are summed and the summed output is pulsed by the pulse generator 46 at 50 mces pulse widths. The pulsed voltages are fed into a variable gain preamplifier 48 having a gain controlled by voltage from a boat speed indicator 50 or alternatively with a fixed gain. The voltages are then fed into a power amplifier 52, and then to a sonar projector 54. The sonar projector 54 creates summed pulsed pressure signals in the water at frequencies centered around 145 kHz and 160 kHz. The nonlinear properties of the media (water) creates 15 kHz pulsed signals in the water. The beam width of these different frequency pulses is about the same as beamwidth of the primary frequencies. To create a beamwidth of 6 degrees at 150 kHz, a circular piston projector can be used that is about 4 inches in diameter. To achieve a 162 dB pressure level at 15 kHz underwater, a source level of about 193 dB at 150 kHz is required at a 175 ft. range a width of 17.5 feet would be insonified at the 3 dB down points.

Both embodiments, the linear and nonlinear projecting systems, can probably have their effectiveness enhanced by having the pulsed repetition rates be directly proportional to boat speed. In FIGS. 6 and 7, this control is indicated by the dashed lines from the boat speed indicator to the waveform generator and to the pulse generator respectively. For example, a speed of 10 MPH could generate 2 pulses per second, while a speed of 50 MPH could generate 10 pulses per second. Higher speeds should generate as much as 12 pulses per second or more. Accordingly, manatees and other mammals will learn to associate the danger of fast approaching boats, while further distinguishing the lower pulse rates with slower moving boats. With this distinction, mammals underwater can better detect and localize the direction and speed of approaching boats and have sufficient time to take appropriate evasive action. This type of differential pulsing lessens potential habituation effects. Varying the center frequencies of the alert signal projecting device would enable mammals including manatees, to move about more safely in a multi boat environment.

While the invention has been shown and described in what is considered to be practical and preferred embodiments, it is recognized that departures may be made within the spirit and scope of the following claims which, therefore, should not be limited except within the Doctrine of Equivalents.

Now that the invention has been described,
What is claimed is:

1. A method of alerting marine mammals and other mammals underwater to the danger of approaching motor vessels, comprising the steps of:

generating a pulsed signal, said pulsed signal being pulsed at a rate proportional with a speed at which the motor vessel is moving through the water, transforming said pulsed signal into a pulsed acoustical signal, and projecting said pulsed acoustical signal in a directional manner underwater from a motor vessel in a direction corresponding with a direction of movement of the motor vessel, said projected pulsed acoustical signal having a beam width between 2° and 18° and resulting in an underwater acoustical signal having a frequency ranging between 3 kHz and 26 kHz, wherein said projected pulse acoustical signal is audible to mammals underwater up to a range that allows mammals a predetermined amount of time to hear and avoid collision with the motor vessel.

2. The method as set forth in claim 1 wherein said pulsed acoustical signal is generated and projected by a linear sonar projecting device.

3. The method as set forth in claim 2 wherein said linear sonar projecting device includes:

a waveform generator for generating the pulsed signal, a vessel speed indicator, a variable gain preamplifier controlled by a voltage from said vessel speed indicator, a power amplifier for amplifying the generated pulse signal, and a sonar projector for projecting the amplified pulsed acoustical signal underwater in a directional manner.

4. The method as set forth in claim 1 wherein said pulsed signal is generated and projected by a nonlinear sonar projecting device.

5. The device as set forth in claim 4 wherein said nonlinear sonar projecting device is a parametric sonar projecting device comprising:

signal generating and modulation means for generating a plurality of signals of different frequencies and summing the frequencies, a vessel speed indicator, a pulse generator for creating a pulse in said plurality of signals, a variable gain amplifier, a power amplifier for amplifying the pulsed plurality of signals, and a sonar projector for creating and projecting summed pulsed signals from the summed frequencies of the amplified pulsed signals underwater in a directional manner, wherein the nonlinear properties of water create the underwater frequency within the 3 kHz to 26 kHz range.

* * * * *